Patented Oct. 27, 1936

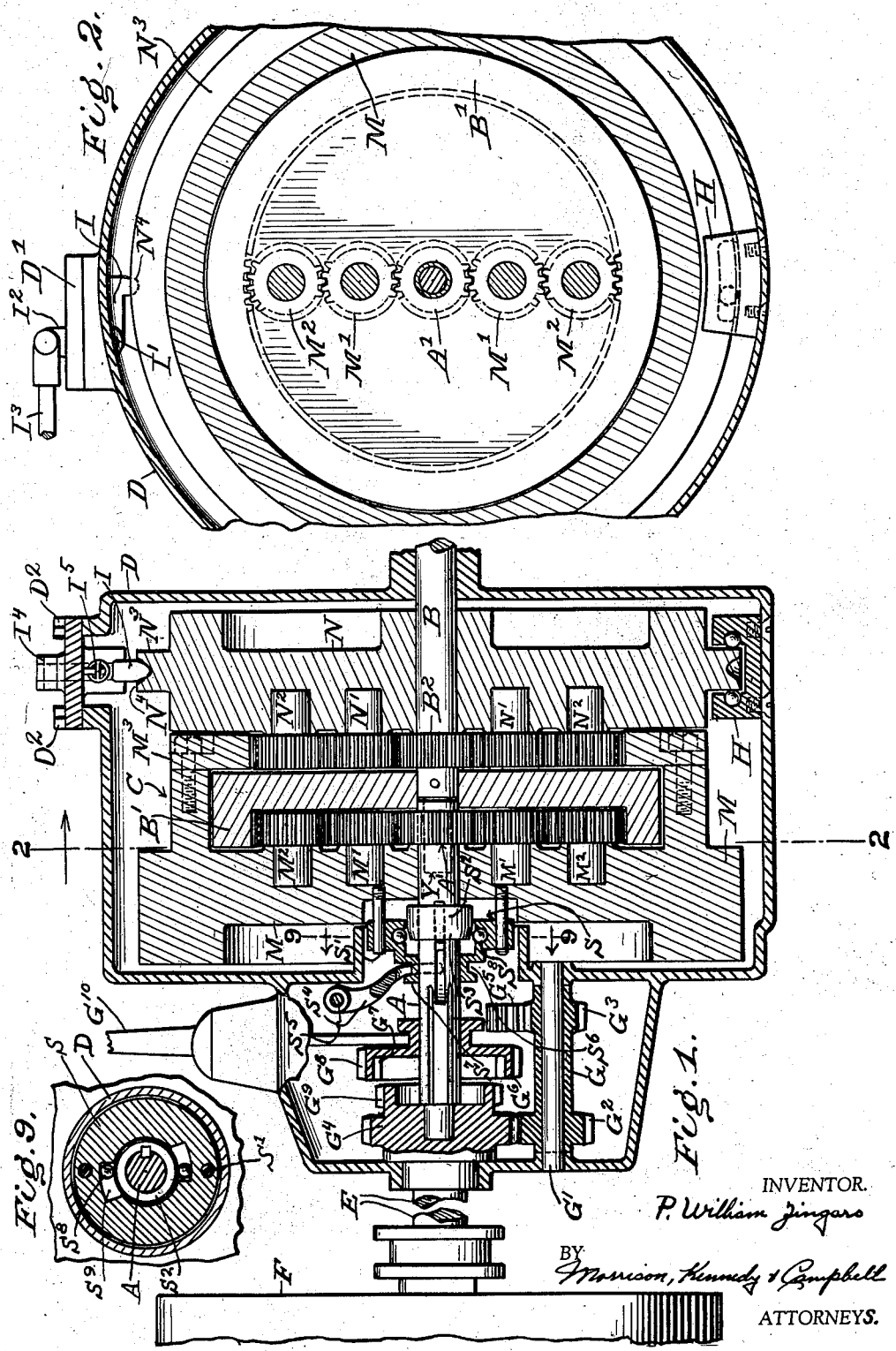

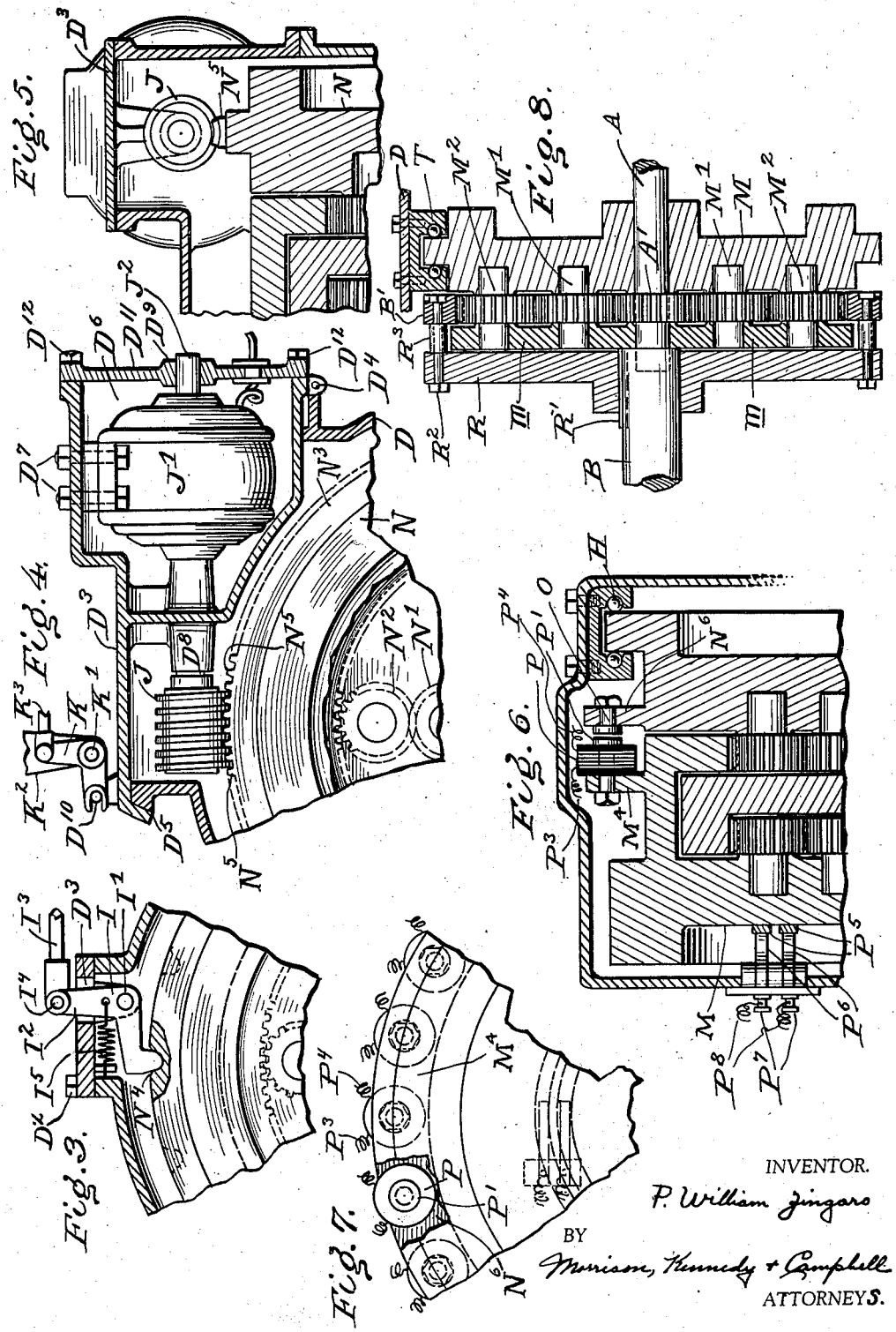

2,058,545

UNITED STATES PATENT OFFICE 2,058,545

AUTOMATIC VARIABLE SPEED TRANSMISSION

Placido William Zingaro, New York, N. Y., assignor to Harry J. Smith, New York, N. Y.

Application October 27, 1933, Serial No. 695,403

28 Claims. (Cl. 74—259)

This invention relates to power transmissions, and more particularly to automatic variable speed power transmissions for effecting a drive of the driven member by the driving member which varies gradually from an initial slow speed reduction gear drive to a direct drive, in accordance with the torque or resistance offered by the driven member. Although the invention has been shown and described as particularly adapted for automobiles, it is to be understood that it is not limited to this specific use, but may be utilized wherever power is to be transmitted at variable or varying speeds and torques from a driving to a driven shaft.

The general object of the invention is to provide a power transmission by which a drive of the driven member is effected through reduction gearing when the torque delivered by, that is the resistance offered by, the driven member is great, and which reduction gear drive is variable in response to a decrease in the torque of the driven member to increase the speed of rotation of the latter and lessen its torque to a point where the reduction gearing ceases to function and a direct drive is established. Further, it is proposed that the improved transmission shall be characterized by its simplicity, efficiency and durability, and shall be constructed of parts which are positive in their action, the mechanism not being dependent upon the use of springs, weights or other ordinary expedients to obtain its flexibility. Also, it is intended that the transmission shall operate on the principle of free wheeling.

According to a preferred embodiment of the invention, the transmission comprises a driving shaft and a driven shaft, and intermediate connections. The two shafts are axially aligned and each is provided adjacent its inner end with a fixed pinion. Each pinion meshes with a series of gears, one series carried by a flywheel concentric with the driving shaft and the other series carried by a second flywheel concentric with the driven shaft. Through one series of gears the pinion on the driving shaft is connected with an internal gear fixed to the driven shaft, and through the other series of gears the pinion on the driven shaft is connected with an internal gear arranged on the first flywheel concentric with the driving shaft.

With this arrangement, the driving shaft effects a reduction gear drive of the driven shaft in accordance with the ratios of the pinion on the driving shaft, the series of gears with which it meshes and the internal gear on the driven shaft, to one another. The driven shaft, in turn, effects a reduction gear drive of the first flywheel in accordance with the ratios of the pinion on the driven shaft, the gears with which it meshes and the internal gear on the flywheel, to one another. This drive of the first flywheel effects a planetary motion or revolution of the gears carried thereby about the pinion on the driving shaft, thus increasing the speed of rotation of the internal gear fixed to the driven shaft, and hence the speed of rotation of the driven shaft itself.

As the mechanism commences to operate, the second flywheel tends to rotate in a reverse direction, but means are provided to prevent such rotation. When the inertia of the first flywheel is sufficiently overcome, however, the second flywheel begins to rotate in the same direction as the driven shaft and other parts, effecting a planetation of the gears which it carries about the pinion on the driven shaft and increasing the speed of rotation of the first flywheel in the same manner as the rotation of the latter flywheel increases the speed of rotation of the driven shaft.

Bearing in mind this interdrive of the parts, it will be clear that since the rotation of the first flywheel increases the speed of rotation of the driven shaft (thereby increasing the speed of the reduction gear drive), and since the driven shaft and the second flywheel, through the gears carried by said flywheel, effect the rotation of the first flywheel, there is a continuous mutual acceleration of the rotation of one element by the other, initiated by the torque delivered by the driving shaft and continued by said torque and the momentum of the flywheels until all elements are rotating at the same speed, or as a unit, at which time a direct drive is established.

When this condition of the parts exists, the entire transmission unit, rotating as a unit, acts as a heavy balance wheel to produce a smooth even drive of the driven shaft and to assist the prime mover in its driving action.

After a direct drive has been established, acceleration of the driven shaft may be effected with the direct drive being substantially maintained. Upon deceleration of the prime mover, the speed of rotation of the driving shaft decreases accordingly, but the remaining parts of the transmission continue their unitary rotation uninfluenced by such deceleration, the gears meshing with the pinion on the driving shaft revolving freely about the pinion. In this manner free wheeling is obtained, and the heavy transmission unit, by reason of its momentum, acts as a source of power to maintain the speed of rotation of the driven member for a longer period than is usual with other free wheeling mechanisms.

It may, at times, be desirable to prevent free wheeling and utilize the braking power of the engine, as when driving in traffic or descending a steep grade, and, hence, means under control of the operator is provided to establish a connection between the driving shaft and the flywheel concentric therewith.

Although the invention has been briefly set forth in the foregoing description, many other objects and features thereof will be brought out in the detailed description to follow.

In the accompanying drawings the invention has been shown merely by way of example and in preferred form, but obviously many modifications and variations may be made therein and in its mode of application which will still be comprised within its spirit. It is to be understood, therefore, that the invention is not limited to any specific form or embodiment, except insofar as such limitations are specified in the appended claims.

Referring to the drawings:

Fig. 1 is a sectional elevation of the improved transmission;

Fig. 2 is a sectional view, partly broken away, taken on the line 2—2 of Fig. 1, looking in the direction of the arrow;

Fig. 3 is a transverse sectional view of a portion of the transmission;

Fig. 4 is a transverse sectional view of a portion of the transmission, showing a modification thereof;

Fig. 5 is an elevation of the modification shown in Fig. 4, looking from left to right;

Fig. 6 is a sectional elevation of a portion of the transmission, showing a modification thereof;

Fig. 7 is a diagrammatic view, looking from left to right, of the modification shown in Fig. 6.

Fig. 8 is a sectional view of a modified form of the transmission; and

Fig. 9 is a transverse elevation taken on the line 9—9 of Fig. 1, looking in the direction of the arrows.

Referring particularly to Fig. 1, the transmission unit comprises a driving shaft A and a driven shaft B, associated with the improved transmission unit C enclosed, as ordinarily, in a casing D. The driving shaft A is connected with the engine shaft E leading from a balance wheel F through a conventional type of sliding gear transmission, including a hollow shaft G rotatably mounted on a fixed shaft $G^1$. The shaft G is formed with gears $G^2$ and $G^3$, the former meshing with a double gear $G^4$ fixed to the engine shaft E and the latter meshing with a reverse gear $G^5$ suitably mounted on a fixed shaft for idle rotation. Slidably mounted on the shaft A and splined thereto is a gear $G^6$, formed with internal teeth $G^7$ and external teeth $G^8$ adapted to mesh, respectively, with teeth $G^9$ on the double gear $G^4$, and reverse gear $G^5$. As will be noted, the gear $G^6$ is adapted to occupy one of three positions, an intermediate idle position, as shown in the drawings, or in mesh with gears $G^9$ or $G^5$ for determining either a forward or reverse drive, respectively, being shiftable to the latter positions by a conventional gear shifting lever $G^{10}$. The parts just described however form no part of the present invention, and further description is deemed unnecessary since any conventional shifting mechanism for determining a forward or reverse drive may be employed.

Coming now to the present invention and particularly the preferred embodiment thereof, which is best shown in Fig. 1, the inner end of the driven shaft B is journaled in a socket Y, formed in the inner end of the driving shaft A, for bearing and alignment purposes. Near its inner end, the driving shaft A has fixed to it a pinion $A^1$, which is adapted to mesh with two idler gears $M^1$, (see also Fig. 2) meshing in turn with two planetary gears $M^2$ and all of which are carried by a heavy flywheel M concentric with the shaft A and freely rotatable with respect to the shaft. The planetary gears $M^2$ are adapted to mesh with an internal gear $B^1$ fixed to the inner end of the driven shaft B, and through which a reduced drive of the driven shaft by the driving pinion $A^1$, idler gears $M^1$, and planetary gears $M^2$ is effected.

The driven shaft, in turn, is equipped with a pinion $B^2$, which is fixed thereto and which meshes with two idler gears $N^1$, the idler gears in turn meshing with two planetary gears $N^2$ and all of which are carried by a second flywheel N, mounted concentrically with the driven shaft B. The planetary gears $N^2$ mesh with an internal gear $M^3$ on the flywheel M. The second flywheel N is formed with a circumferentially extending raised rib $N^3$, and associated therewith and secured to the casing D is a ball and slot one-way clutch H, adapted to permit rotation of the flywheel in the same direction as that of the driven shaft B, but to prevent a reverse rotation. On its periphery, the rib $N^3$ is formed with a plurality of recesses $N^4$, adapted to be engaged by a pawl I (see Fig. 3) carried by a removable cover plate $D^1$ secured to the casing D by set screws $D^2$. The pawl I is in the form of a bell crank pivotally mounted as at $I^1$, the arm $I^2$ of the bell crank projecting upwardly through an opening $D^3$ in the plate $D^1$ and having a control rod $I^3$ secured to its distal end, as at $I^4$, and which connects the pawl with actuating means conveniently located within reach of the operator. The pawl I is adapted to be controlled manually for disengagement from the recesses $N^4$, and a tension spring $I^5$ is provided to effect the engagement of the pawl with the recesses. The purpose of the pawl will be described hereinafter.

The operation of the device as thus far described is as follows: Assuming a connection to have been established by the sliding gear transmission between the engine shaft E and the driving shaft A, rotation of the latter effects a rotation of the pinion $A^1$ fixed thereto. The rotation of the pinion $A^1$ produces a rotation of the idler gears $M^1$ and the planetary gears $M^2$, and the planetary gears in turn effect a rotation of the internal gear $B^1$ fixed to the driven shaft B, the rotation of the latter, however, being much slower than that of the shaft A and in accordance with the ratio of the pinion $A^1$, gears $M^1$ and $M^2$ (if of different size) and internal gear $B^1$, to one another. With this arrangement, a reduction gear drive of the driven shaft B is obtained.

When the driven shaft B rotates, turning its pinion $B^2$ with it, the latter effects the rotation of the gears $N^1$ and $N^2$, and the gears $N^2$ meshing with the internal gear $M^3$ on the flywheel M tend to rotate the latter. However, the resistance offered by the flywheel M effects a tendency of the flywheel N to rotate in a direction reverse to the rotation of the driven shaft B, but this is prevented by the operation of the clutch H which holds the flywheel N stationary and permits the operation of the gears $N^1$ and $N^2$ to effect a positive forward rotation of the flywheel M.

As the flywheel M rotates, it carries with it the gears M¹ and M², whereby they not only rotate, but also have a planetary movement about the pinion A¹. This planetary movement of the gears, coupled with their rotation, effects an increase in the speed of rotation of the internal gear B¹ and, of course, the driven shaft B to which it is connected. When it starts to rotate, the flywheel M tends to carry the planetary gears N² with it, and, hence, tends to rotate the flywheel N carrying the gears N², but until the flywheel M has gathered sufficient momentum, its effect on the flywheel N is offset by the tendency of the latter to rotate in a reverse direction. However, when the positive drive of the flywheel M through the gears N¹ and N² increases its speed of rotation to the point where its momentum is sufficient to overcome the tendency of the flywheel N to rotate in a reverse direction, the latter starts to rotate continuously in the same direction as the flywheel M, gradually increasing its speed and gathering momentum until it rotates at the same speed as the flywheel M. As the speeds of rotation of the flywheels M and N increase, and the idler and planetary gears which they carry revolve about the pinions with which the idler gears respectively mesh, the rotation of the idler and planetary gears gradually diminishes, (by virtue of their revolving at a speed approaching the speed of rotation of the pinions) and at the time when the flywheels are rotating at the same speed and at a speed equal to that of the driving shaft A, the rotation of the idler and planetary gears ceases altogether, and the internal gear B¹ (and hence the driven shaft B) is rotated at the same speed as the driving shaft A. At this time all of the parts are rotating as a unit and a direct drive is established.

While operating in direct drive, further acceleration of the prime mover to obtain an increase in speed causes the flywheels M and N to again rotate at different relative speeds, but because of the momentum of the vehicle and the flywheels M and N, the torques of the driving and driven shafts are quickly equalized and the momentary interruption of the direct drive is unnoticeable. On the other hand, if the increased acceleration of the prime mover is for the purpose of obtaining more power (as when the automobile is climbing a hill), the equalization of the torques of the driving and driven shafts is not as readily accomplished, whereupon the flywheels M and N continue to rotate at different relative speeds and power is delivered through the variable reduction gear drive until such time as the equalization of said torques is accomplished.

Whether operating in direct or through the reduction gear drive, if the prime mover is decelerated the driving shaft A will slow down accordingly, whether it be simply to a reduced acceleration or to an idling speed. Under these conditions, the flywheels M and N and associated parts, due to their momentum and the momentum of the vehicle, either continue or come to unitary rotation, the idler gears M¹ revolving freely about the pinion A¹. Since the pinion A¹ is rotating in the same direction as the transmission unit, it has no influence on the latter which would tend to disrupt the unitary rotation thereof. With this condition existing, the vehicle operates on the principle of free wheeling. As in any other instance when a direct drive is established, if the prime mover is again accelerated, the speed of rotation of the driving shaft A and its pinion A¹ will be increased without influencing the drive of the vehicle until it equals the speed of rotation of the transmission unit, and thereafter a further increase in the speed of rotation of the driving shaft will effect an operation of the transmission unit in the manner already described until a direct drive at an increased speed is established.

Operation under conditions of free wheeling may not be desirable at all times, and, therefore, means is provided whereby free wheeling may be permitted or prevented as desired. This means comprises an overrunning or one-way ball and slot clutch S, (see Fig. 1) rotatably mounted on the driving shaft A and secured to the flywheel M for rotation therewith by means of studs S¹, on which it is slidably mounted for fore-and-aft movement into and out of operative engagement with a collar S², formed with a bevelled edge S³ and which is keyed to the shaft A. For effecting the fore-and-aft movement of the clutch S, a shifting yoke S⁴, fixed to a rock shaft S⁵ actuable by the operator, engages with a circumferential groove S⁶ formed in an extended portion S⁷ of the clutch S. The yoke permits the free rotation of the clutch with the flywheel M and serves not only to shift the clutch into and out of operative position, but also to maintain it in its shifted position.

In operation, when the parts are in the position shown in Fig. 1, the clutch S is in inoperative position or disengaged from the collar S², and the transmission unit operates as already described and on the principle of free wheeling. When the clutch S is shifted aft, or to the right in Fig. 1, the balls S⁸ are brought into position to engage the bevelled edge S³ of the collar S². However, if the driving shaft A rotates faster than the flywheel M, turning in a counterclockwise direction (see Fig. 9), the balls S⁸ play in the deeper portions of slots S⁹ and have no effect whatever on the parts. Thus, the transmission unit may operate as usual to effect a variable reduction gear drive. Upon deceleration, the speed of rotation of the shaft A tends to decrease while that of the flywheel remains the same, the latter tending to overrun the shaft A. But when this condition exists, the balls S⁸ move to the shallow ends of the slots S⁹, and since their diameters are greater than the depth of the slots at this point, they are forced into engagement with the collar S², gripping the latter and preventing the overrunning of the flywheel M.

The function of the pawl I will now be described. Assuming that it is desired to maintain a very slow speed drive of the vehicle, the pawl I through the control rod I³ is released to permit the tension spring I⁵ to exercise itself and effect an engagement of the pawl with one of the recesses N⁴ formed in the rib N³ of the flywheel N. Such engagement of the pawl with a recess prevents rotation of the flywheel in either direction (although the clutch H is still effective to prevent rotation in one direction), and a direct drive can not be established, the speed of rotation of the driven member being limited to that which is obtainable through the variable reduction gear drive, less the range of variability offered by the revolution of the gears N¹ and N² when the flywheel N rotates.

The pawl I serves still another purpose. If it is desired to utilize the prime mover as a brake, as when descending a hill or in traffic, the pawl may be released to prevent rotation of the flywheel N. It is for this use that a spring, such as the spring I⁵, is employed to effect a yielding engagement of the pawl I with the recesses N⁴, so that if the unit is rotating in direct drive much more rapidly than it rotates at the highest speed of the reduction gear drive, the pawl will be permitted to slip from one recess to another and operate gradually to stop the flywheel N from rotating, instead of bringing the latter to a sudden stop which would produce a severe strain on the entire mechanism.

It will be obvious that a different form of means for preventing the rotation of the flywheel N could be employed. For example, the pawl I could be in the form of a drag operating in a continuous circumferential groove formed in the rib $N^3$, and could be entirely under the control of the operator so that it could be pressed into engagement with the groove under varying degrees of pressure to produce a gradual cessation of rotation of the flywheel. Also, a brake band could be employed which would be under the control of the operator. Other similar expedients will readily suggest themselves to those skilled in the art.

In some instances (perhaps more usually when the transmission is used in conjunction with mechanisms other than an automobile), it may be desirable to eliminate the ball and slot clutch H to permit rotation of the flywheel N in either direction, and to control its speed of rotation positively to effect a continued drive through the reduction gearing, but at a higher or a lower speed than could be obtained if the flywheel were held stationary, as by the pawl I. The said higher speed will be obtained when the flywheel N is rotated in the same direction as the other elements of the transmission unit so that the flywheel M is driven through the gears $N^1$ and $N^2$ and in effect rotates the flywheel N but only at a limited speed and less than its own speed of rotation. On the other hand, if the flywheel N is rotated in a reverse direction, its rotation will oppose that of the flywheel M, so that the latter's speed of rotation will be even lower than when the flywheel N remains stationary.

In Figs. 4 and 5, there is shown means for effecting this mode of operation of the transmission, which comprises a worm J meshing with teeth $N^5$ formed on the rib $N^3$ of the flywheel N, and which is driven by an electric motor $J^1$. The motor $J^1$ may be of any suitable type operable to rotate the worm J at different speeds and in different directions, such, for example, as a direct current motor with a rheostat in the armature or field circuit and a reversing switch, or, if desired, a variable speed and reversing gear arrangement between the motor shaft and the worm. Obviously, the type of motor employed and its means of control is a matter of choice and need not be considered further in connection with the present invention.

In adapting the motor for use in connection with the transmission unit, the casing D is formed with a movable section $D^3$, pivotally mounted as at $D^4$ and formed for a fluid-tight but relatively movable engagement with the casing D, as at $D^5$. The movable section $D^3$ is formed with a compartment $D^6$ in which the motor $J^1$ is adapted to be housed and kept free from the oil or grease in which the transmission unit operates. The motor J is suspended within the compartment $D^6$, as by bolts $D^7$, and further support is obtained from bearings $D^8$ and $D^9$ in which the motor shaft $J^2$ is journaled.

In order that the motor $J^1$ may be utilized only as desired, a control is provided for swinging the section $D^3$ about its pivot $D^4$, and thereby raising the worm J out of engagement with the teeth $N^5$ of the flywheel N. This control is in the form of a bell crank K, pivotally mounted as at $K^1$ to a rigid support $K^2$. One arm of the bell crank is bifurcated for engagement with a pin $D^{10}$ secured in spaced relation to the top wall of the section $D^3$, and a rod $K^3$ is secured to the other arm of the bell crank K and is arranged for manual control to rock the latter about its pivot $K^1$ to raise and lower the section $D^3$.

The transmission unit will operate as usual, save for the flywheel N, whose speed of rotation will be controlled by the drive through the worm J, to prevent the establishment of a direct drive. At any time when it is desired to permit a direct drive to be established, however, the worm J may be disengaged from the teeth $N^5$ on the flywheel $N^4$ by actuating the control rod $K^3$ which, acting through the bell crank K, will raise the entire section $D^3$ to disengage the worm J from the teeth $N^5$ but not sufficiently to break the engagement of the casing D and section $D^3$ at the point $D^5$, which would permit the oil or grease to be splashed through the opening thus created.

In order that the motor $J^1$ may be readily accessible, and to permit its installation and removal, one wall of the compartment $D^6$ is in the form of a cover plate $D^{11}$, secured in place by set screws $D^{12}$. Assuming the parts to be in the condition shown in Fig. 4, if it is desired to remove the motor, the cover plate $D^{11}$ is removed and the bell crank K disconnected from the pin $D^{10}$. The section $D^3$ is then rocked about its pivot $D^4$ sufficiently to permit access to the worm J which can be pulled off the motor shaft $J^2$. Removal of the bolts $D^7$ completely detaches the motor from the section $D^3$, so that it may be withdrawn through the opening covered by the plate $D^{11}$, the motor shaft $J^3$ sliding freely through the bearing $D^8$. In order to install the motor, the succession of operations just described is reversed.

Coming now to the construction shown in Figs. 6 and 7, it may in certain instances be desirable to have supplemental means to aid in establishing the direct drive, such, for example, as when more than the usual torque is offered by the driven member, or, to hasten the establishment of the direct drive when the torque offered by the driven member is no greater than usual. In adapting the transmission unit to meet this condition, the flywheels M and N are formed with ribs $M^4$ and $N^6$, respectively. The rib $N^6$ is preferably equipped with a plurality of iron cores O, although, of course, a continuous circumferentially extending iron core could be employed. The rib $M^4$ is equipped with a corresponding number of electromagnets P, the cores $P^1$ of which are axially aligned with the iron cores O and arranged in slightly spaced relation thereto, as shown in Fig. 6. Two wires $P^3$ and $P^4$ lead from each magnet to a pair of conductors $P^5$, formed on the flywheel M, and which are engaged by a pair of brushes $P^6$ connected to posts $P^7$ secured to the casing D, and to which electric current is delivered from an outside source through wires $P^8$.

A switch may be provided for turning the electric current on and off, as desired. However, when the electric current is on, an attraction is set up between the magnets P and the cores O, so that as the flywheel M is rotated by the driven shaft B, carrying with it the magnets P, the attractive force between the magnets and the cores O tends to rotate the flywheel N, thus hastening the time at which the flywheel N will commence to rotate, and also assisting to increase its acceleration, and hence the time when a direct drive will be established. Furthermore, the magnetic attraction serves to maintain the unitary rotation of the unit to a greater degree than it would be maintained in the absence of this assisting force. With the electric current shut off, the device will operate in the usual manner, the only difference being that the magnets and cores, and the ribs by which they are supported, will give additional weight to the flywheels, and thus add to the momentum of the unit which, as already pointed out, serves by its momentum as a secondary source of power when the prime mover is decelerated, and which assists the prime mover when driving at a constant speed.

In Fig. 8, there is shown a modification of the entire transmission unit, the essential difference however, being the omission of the flywheel N and the positive drive of the flywheel M by the driven shaft B. In the embodiment shown in this figure, the driving shaft A, which is axially aligned with the driven shaft B, carries as before the pinion $A^1$, in mesh with two idler gears $M^1$, which in turn mesh with two planetary gears $M^2$ engaging with the internal gear $B^1$ fixed to the driven shaft B. In this embodiment of the invention, the idler and planetary gears are held in place by a strap $m$ which is secured to the flywheel M.

The internal gear $B^1$ is carried by a heavy plate or flywheel R which is keyed to the driven shaft as at $R^1$, the internal gear $B^1$ being bolted to the plate R, as by bolts $R^2$, and held in spaced relation thereto by spacers $R^3$ in order to span the strap $m$ and engage with the planetary gears $M^2$.

In operation, the driving shaft A, operating through the pinion $A^1$, idler gears $M^1$, planetary gears $M^2$ and internal gear $B^1$ effects a reduction gear drive of the driven member B. Unlike the preferred embodiment, there is no positive drive of the flywheel M by the driven member, and hence the reduced drive continues until the torque offered by the driven member has been reduced and its speed of rotation increased sufficiently so that the tendency of the internal gear $B^1$ to rotate the flywheel M overcomes the tendency of the flywheel to rotate in a reverse direction, whereafter the flywheel will be rotated in the same direction as the internal gear $B^1$. To prevent the reverse rotation of the flywheel in the early stages of operation, there is provided a one-way ball and slot clutch T, substantially like the clutch H, which is adapted to be fixedly secured to the transmission casing D as in the preferred embodiment.

When the flywheel M commences to rotate, a planetary movement of the gears $M^1$ about the pinion $A^1$ is effected increasing the speed of the reduction gear drive until the flywheel M, driving shaft A and plate or flywheel R (turning the driven shaft B with it) rotate at the same speed, at which time the rotation of the gears $M^1$ and $M^2$ ceases and a direct drive is established.

This embodiment of the invention is susceptible to the same modifications as the preferred embodiment. It operates upon the principle of free wheeling and may be provided with means to permit or prevent this operation, as desired. The flywheel (M in this instance) may be adapted for operation by an electric motor to control its speed of rotation. Also it may be controlled as by the pawl I, to utilize the reduction gear drive as a brake. Finally, the plate or flywheel R may be equipped with electromagnets and the flywheel M with iron cores so that the rotation of the former will more readily effect that of the latter.

Having thus described my invention, what I claim is:

1. A variable speed transmission, comprising a driving shaft equipped with driving means, a driven shaft equipped with driving means, intermediate driving connections between the driving and driven shafts for effecting the rotation of the latter by the former, a rotatable weight carrying said intermediate driving connections, said weight possessing sufficient mass to produce by its inertia effect a gradual change in the rate of speed of rotation of the driving and driven shafts when said shafts partake of relative rotation, and means to prevent rotation of the weight in one direction.

2. A variable speed transmission, comprising a driving shaft equipped with driving means, a driven shaft equipped with driving means, intermediate driving connections between the driving and driven shafts for effecting the rotation of the latter by the former, a rotatable weight carrying said intermediate driving connections, said weight possessing sufficient mass to produce by its inertia effect a gradual change in the rate of speed of rotation of the driving and driven shafts when said shafts partake of relative rotation, means to prevent rotation of the weight in one direction, and other means operable to prevent rotation of the weight in either direction.

3. A variable speed transmission, comprising a driving shaft equipped with driving means, a driven shaft equipped with driving means, intermediate driving connections between the driving and driven shafts for effecting the rotation of the latter by the former, a rotatable weight carrying said intermediate driving connections, said weight possessing sufficient mass to produce by its inertia effect a gradual change in the rate of speed of rotation of the driving and driven shafts when said shafts partake of relative rotation, and a clutch associated with the weight to permit its rotation in one direction only.

4. A variable speed transmission, comprising a driving shaft equipped with driving means, a driven shaft equipped with driving means, intermediate driving connections between the driving and driven shafts for effecting the rotation of the latter by the former, a rotatable weight carrying said intermediate driving connections, said weight possessing sufficient mass to produce by its inertia effect a gradual change in the rate of speed of rotation of the driving and driven shafts when said shafts partake of relative rotation, and independent means for rotating said weight.

5. A variable speed transmission, comprising a driving shaft equipped with driving means, a driven shaft equipped with driving means, intermediate driving connections between the driving and driven shafts for effecting the rotation of the latter by the former, a rotatable weight carrying said intermediate driving connections, said weight possessing sufficient mass to produce by its inertia effect a gradual change in the rate of speed of rotation of the driving and driven shafts when said shafts partake of relative rotation, and means to control the speed and direction of rotation of the weight.

6. A variable speed transmission, comprising a driving shaft equipped with driving means, a driven shaft equipped with driving means, intermediate driving connections between the driving and driven shafts for effecting the rotation of the latter by the former, and a rotatable flywheel carrying said intermediate driving connections and possessing sufficient mass to produce by its inertia effect a gradual change in the rate of speed of rotation of the driving and driven shafts when said shafts partake of relative rotation, said flywheel being in the form of an annular balanced member formed on its periphery with a worm gear adapted to be engaged by a worm driven by auxiliary power means to control the speed of rotation of the flywheel.

7. A variable speed transmission, comprising a driving shaft equipped with driving means, a driven shaft equipped with driving means, intermediate driving connections between the driving and driven shafts for effecting the rotation of the latter by the former, a rotatable flywheel carrying said intermediate driving connections and possessing sufficient mass to produce by its inertia effect a gradual change in the rate of speed of rotation of the driving and driven shafts when said shafts partake of relative rotation, said flywheel being in the form of an annular balanced member formed on its periphery with a worm gear adapted to be engaged by a worm driven by auxiliary power means to control the speed of rotation of the flywheel, and means for effecting the engagement and disengagement of the worm and worm gear, as desired.

8. A variable speed transmission, comprising a driving shaft equipped with driving means, a driven shaft equipped with driving means, intermediate driving connections between the driving and driven shafts for effecting the rotation of the latter by the former, and a rotatable flywheel carrying said intermediate driving connections and possessing sufficient mass to produce by its inertia effect a gradual change in the rate of speed of rotation of the driving and driven shafts when said shafts partake of relative rotation, said flywheel being in the form of an annular balanced member formed on its periphery with a worm gear adapted to be engaged by a worm driven by auxiliary power means to control the speed of rotation of the flywheel, said power means being arranged in a section of the transmission casing movable relatively to the remainder of the casing to effect the engagement and disengagement of the worm and worm gear.

9. A variable speed transmission, comprising a driving shaft equipped with driving means, a driven shaft equipped with driving means, intermediate driving connections between the driving and driven shafts for effecting the rotation of the latter by the former, and a rotatable flywheel carrying said intermediate driving connections and possessing sufficient mass to produce by its inertia effect a gradual change in the rate of speed of rotation of the driving and driven shafts when said shafts partake of relative rotation, said flywheel being in the form of an annular balanced member formed on its periphery with a worm gear adapted to be engaged by a worm driven by auxiliary power means to control the speed and direction of rotation of the flywheel, said power means being arranged in a section of the transmission casing movable relatively to the remainder of the casing to effect the engagement and disengagement of the worm and worm gear.

10. A variable speed transmission, comprising a driving shaft equipped with driving means, a driven shaft equipped with driving means, intermediate driving connections between the driving and driven shafts for effecting the rotation of the latter by the former, a rotatable flywheel carrying said intermediate driving connections and possessing sufficient mass to produce by its inertia effect a gradual change in the rate of speed of rotation of the driving and driven shafts when said shafts partake of relative rotation, said flywheel being in the form of an annular balanced member formed on its periphery with a worm gear adapted to be engaged by a worm driven by auxiliary power means to control the speed and direction of rotation of the flywheel, said power means being arranged in a section of the transmission casing movable relatively to the remainder of the casing to effect the engagement and disengagement of the worm and worm gear, and means for moving said section of the casing.

11. A variable speed transmission, comprising a driving shaft having a driving gear fixed thereto, a driven shaft having a driving gear fixed thereto, planetary gearing between said driving gears to effect a rotation of the driven shaft by the driving shaft, said planetary gearing effecting a reduction gear drive of the driven shaft, a rotatable weight balanced about its axis and mounted concentrically with the driving shaft, said weight carrying said planetary gearing and by its rotation effecting a planetation of the planetary gearing about the driving gear on the driving shaft to vary the ratio of the speed of rotation of the driving shaft to that of the driven shaft, and said weight being freely rotatable relatively to the driving shaft and possessing sufficient mass to produce by its inertia effect a gradual variation of said ratio, and means operable to render the weight rotatable relatively to the driving shaft only when the speed of rotation of the driving shaft exceeds that of the weight.

12. A variable speed transmission, comprising a driving shaft having a driving gear fixed thereto, a driven shaft having a driving gear fixed thereto, planetary gearing between said driving gears to effect a rotation of the driven shaft by the driving shaft, said planetary gearing effecting a reduction gear drive of the driven shaft, a rotatable weight balanced about its axis and mounted concentrically with the driving shaft, said weight carrying said planetary gearing and by its rotation effecting a planetation of the planetary gearing about the driving gear on the driving shaft to vary the ratio of the speed of rotation of the driving shaft to that of the driven shaft, and said weight being in the form of an annular flywheel possessing sufficient mass to produce by its inertia effect a gradual variation of said ratio, and an overrunning clutch operable to establish a connection between the flywheel and the driving shaft, as desired.

13. A variable speed transmission, comprising a driving shaft equipped with driving means, a driven shaft equipped with driving means, intermediate driving connections between the driving and driven shafts for effecting the rotation of the latter by the former, a rotatable weight, means for mounting said weight for rotation relatively to the driving and driven shafts, means for mounting said intermediate driving connections on the weight, said weight possessing sufficient mass to produce by its inertia effect a gradual change in the rate of speed of rotation of the driving and driven shafts when said shafts partake of relative rotation, and means other than said driving means and intermediate driving connections responsive to the rotation of the driven shaft to effect the rotation of said weight.

14. A variable speed transmission, comprising a driving shaft equipped with driving means, a driven shaft equipped with driving means, intermediate driving connections between the driving and driven shafts for effecting the rotation of the latter by the former, a rotatable weight, means for mounting said weight for rotation relatively to the driving and driven shafts, means for mounting said intermediate driving connections on the weight, said weight possessing sufficient mass to produce by its inertia effect a gradual change in the rate of speed of rotation of the driving and driven shafts when said shafts partake of relative rotation, and other driving connections between the driven shaft and said rotatable weight to effect a positive rotation of the weight by the driven shaft.

15. A variable speed transmission, comprising a driving shaft having a driving gear fixed thereto, a driven shaft having a driving gear fixed thereto, planetary gearing between said driving gears to effect a rotation of the driven shaft by the driving shaft, said planetary gearing effecting a reduction gear drive of the driven shaft, a rotatable weight balanced about its axis and mounted concentrically with the driving shaft, said weight carrying said planetary gearing and by its rotation effecting a planetation of the planetary gearing about the driving gear on the driving shaft to vary the ratio of the speed of rotation of the driving shaft to that of the driven shaft and said weight possessing sufficient mass to produce by its inertia effect a gradual variation of said ratio, a second driving gear on the driven shaft, and driving connections between said second driving gear and said rotatable weight to effect a positive rotation of the weight by the driven shaft, said driving connections for rotating said weight comprising planetary gearing to effect a reduction gear drive of said weight and being arranged to planetate about said second driving gear on the driven shaft.

16. A transmisison as set forth in claim 15, wherein the planetary gearing for rotating the weight concentric with the driving shaft is carried by a second rotatable weight balanced about its axis and mounted concentrically with the driven shaft and possessing sufficient mass to produce by its inertia effect a gradual change in the speed of planetation of said planetary gears when the driving and driven shafts partake of relative rotation.

17. A transmission as set forth in claim 15, wherein the planetary gearing for rotating the weight concentric with the driving shaft is carried by a second rotatable weight balanced about its axis and mounted concentrically with the driven shaft and possessing sufficient mass to produce by its inertia effect a gradual change in the speed of planetation of said planetary gears when the driving and driven shafts partake of relative rotation, and wherein the rotatable weight mounted concentrically with the driven shaft is in the form of an annular balanced flywheel, and including means associated with said flywheel to control its speed of rotation.

18. A transmission as set forth in claim 15, wherein the planetary gearing for rotating the weight concentric with the driving shaft is carried by a second rotatable weight balanced about its axis and mounted concentrically with the driven shaft and possessing sufficient mass to produce by its inertia effect a gradual change in the speed of planetation of said planetary gears when the driving and driven shafts partake of relative rotation, and wherein the rotatable weight mounted concentrically with the driven shaft is in the form of an annular balanced flywheel, and including means associated with said flywheel to control its speed and direction of rotation.

19. A variable speed transmission, comprising a driving shaft, a pinion fixed thereto, a flywheel mounted concentrically therewith, idler gears carried by said flywheel and meshing with said pinion, planetary gears carried by said flywheel and meshing with said idler gears, a driven shaft, an internal gear fixed thereto and meshing with said planetary gears, a second pinion fixed to the driven shaft, a second flywheel mounted concentrically with the driven shaft, idler gears carried by said second flywheel and meshing with the pinion on the driven shaft, planetary gears carried by said second flywheel and meshing with the idler gears carried thereby, and a second internal gear fixed to said first-mentioned flywheel and meshing with the planetary gears carried by the second flywheel.

20. A variable speed transmission, comprising a driving shaft, a pinion fixed thereto, a flywheel mounted concentrically therewith, idler gears carried by said flywheel and meshing with said pinion, planetary gears carried by said flywheel and meshing with said idler gears, a driven shaft, an internal gear fixed thereto and meshing with said planetary gears, a second pinion fixed to the driven shaft, a second flywheel mounted concentrically with the driven shaft, idler gears carried by said second flywheel and meshing with the pinion on the driven shaft, planetary gears carried by said second flywheel and meshing with the idler gears carried thereby, a second internal gear fixed to said first-mentioned flywheel and meshing with the planetary gears carried by the second flywheel, and an overrunning clutch operable to establish a connection between the driving shaft and the flywheel concentric therewith.

21. A transmission as set forth in claim 19, wherein one of the flywheels is provided on its periphery with one or more iron cores and the other of said flywheels is provided with a corresponding number of electromagnets in spaced relation to said iron core or cores, said magnet or magnets being operative to set up an attractive force between it or them and the iron core or cores to effect a rotation of the flywheel carrying said core or cores when the other flywheel is rotated.

22. A variable speed transmission, comprising a driving shaft having a driving gear fixed thereto, a driven shaft having a driving gear fixed thereto, planetary gearing between said driving gears to effect a rotation of the driven shaft by the driving shaft, said planetary gearing effecting a reduction gear drive of the driven shaft, a rotatable weight, means for mounting said weight for rotation relatively to the driving and driven shafts, means for mounting said planetary gearing on the weight, said weight by its rotation effecting a planetation of the planetary gearing about the driving gear on the driving shaft to vary the ratio of the speed of rotation of the driving shaft to that of the driven shaft and possessing sufficient mass to produce by its inertia effect a gradual variation of said ratio, and driving connections between the driven shaft and the weight to effect a positive rotation of the weight in response to the rotation of the driven shaft.

23. A transmission as set forth in claim 22, wherein the weight is mounted concentrically with the driving shaft and is freely rotatable relatively thereto.

24. A transmission as set forth in claim 15, wherein the planetary gearing for rotating the weight concentric with the driving shaft is carried by a second rotatable weight balanced about its axis and mounted concentrically with the driven shaft and possessing sufficient mass to produce by its inertia effect a gradual change in the speed of planetation of said planetary gears when the driving and driven shafts partake of relative rotation, and means associated with said rotatable weights to effect a rotation of the weight concentric with the driven shaft in response to the rotation of the weight concentric with the driving shaft.

25. A transmission as set forth in claim 15, wherein the planetary gearing for rotating the weight concentric with the driving shaft is carried by a second rotatable weight balanced about its axis and mounted concentrically with the driven shaft and possessing sufficient mass to produce by its inertia effect a gradual change in the speed of planetation of said planetary gears when the driving and driven shafts partake of relative rotation, said weight concentric with the driven shaft being in the form of an annular balanced flywheel, and including auxiliary power means having a driving connection with the flywheel concentric with the driven shaft and being operative to effect the rotation of the latter to control its speed and direction of rotation.

26. A variable speed transmission, comprising a driving shaft equipped with driving means, a driven shaft equipped with driving means, intermediate driving connections between the driving and driven shafts for effecting the rotation of the latter by the former, a weight arranged to effect a rotation of said intermediate connections, means for rotating said weight, a second rotatable weight, and means associated with said weights and operative to cause said second weight to rotate in response to the rotation of the first mentioned weight, said weights possessing sufficient mass to produce by their inertia effect a gradual change in the rate of speed of rotation of the driving and driven shafts when said shafts partake of relative rotation.

27. A variable speed transmission, comprising a driving shaft equipped with driving means, a driven shaft equipped with driving means, intermediate driving connections between the driving and driven shafts for effecting the rotation of the latter by the former, a weight arranged to effect a rotation of said intermediate connections, means for rotating said weight, a second rotatable weight, and means associated with said weights and operable at will to cause said second weight to rotate in response to the rotation of the first weight, said weights possessing sufficient mass to produce by their inertia effect a gradual change in the rate of speed of rotation of the driving and driven shafts when said shafts partake of relative rotation.

28. A transmission as set forth in claim 27, wherein said second weight is arranged to effect the rotation of the means for rotating the first mentioned weight.

P. WILLIAM ZINGARO.